United States Patent [19]

Flueckiger

[11] Patent Number: 5,236,288

[45] Date of Patent: Aug. 17, 1993

[54] CUTTER WITH POSITIVELY LOCKED ROUND INSERTS

[75] Inventor: Rudolph H. Flueckiger, Fort Myers, Fla.

[73] Assignee: National Carbide Outlet, Inc., Fort Meyrs, Fla.

[21] Appl. No.: 985,962

[22] Filed: Dec. 4, 1992

Related U.S. Application Data

[63] Continuation of Ser. No. 789,299, Nov. 8, 1991, abandoned.

[51] Int. Cl.⁵ .............................................. B23C 5/22
[52] U.S. Cl. ........................................ 407/36; 407/42; 407/62
[58] Field of Search ............... 408/199, 200, 188, 713; 407/34, 36, 40, 42, 44, 47, 48, 53, 54, 65, 103, 104, 81, 82, 113, 62, 64

[56] References Cited

U.S. PATENT DOCUMENTS

| | | | |
|---|---|---|---|
| 1,460,030 | 6/1923 | Mattson | 407/42 |
| 3,597,104 | 8/1971 | Salcumbe | 408/188 |
| 3,643,310 | 2/1972 | Kilbourne et al. | 407/36 |
| 3,759,625 | 9/1973 | Iversen | 407/48 |
| 3,816,893 | 6/1974 | Farrow | 407/40 |
| 3,831,237 | 8/1974 | Sunsalus | 407/48 |
| 4,057,884 | 11/1977 | Suzuki | 407/89 |
| 4,220,428 | 9/1980 | Suzuki | 407/89 |
| 4,382,477 | 5/1983 | Barr | 407/48 |
| 4,566,828 | 1/1986 | Reinsauer | 407/48 |
| 5,145,294 | 9/1992 | Flueckiger | 407/42 |

FOREIGN PATENT DOCUMENTS

| | | | |
|---|---|---|---|
| 546954 | 4/1956 | Belgium | 407/36 |
| 2756819 | 7/1978 | Fed. Rep. of Germany | 407/40 |
| 2746958 | 4/1979 | Fed. Rep. of Germany | 407/42 |
| 587854 | 4/1947 | United Kingdom | 407/148 |
| 589514 | 6/1947 | United Kingdom | 408/188 |

Primary Examiner—Daniel W. Howell
Attorney, Agent, or Firm—Leydig, Voit & Mayer

[57] ABSTRACT

Round indexable cutting inserts are locked in fixed angular positions in the pockets of a milling cutter by conically tipped screws which seat in recesses formed in the back faces of the inserts. By turning the screws, their tips may be retracted to inactive positions to enable conventional polygonal inserts to be used in the pockets.

7 Claims, 1 Drawing Sheet

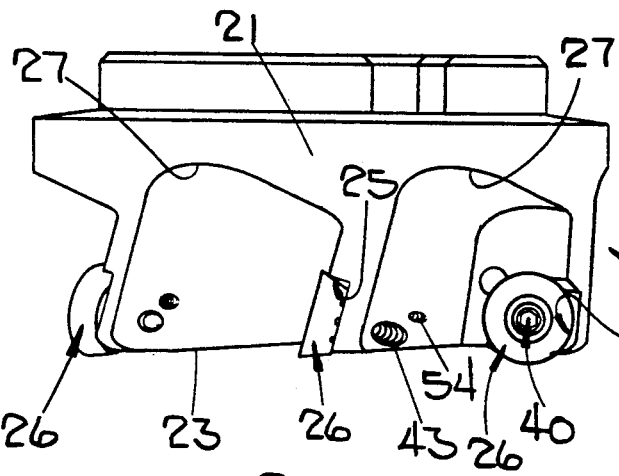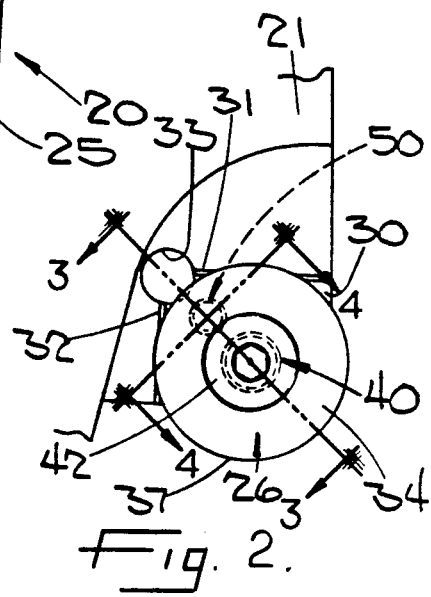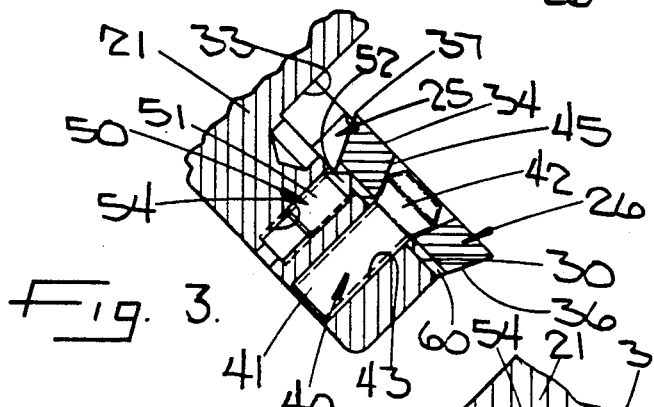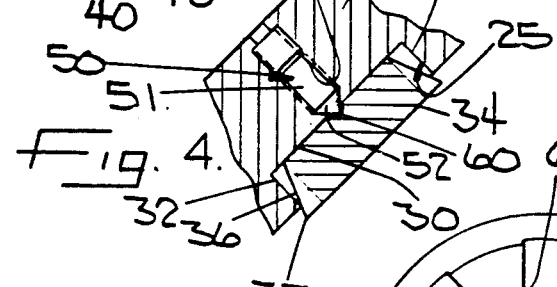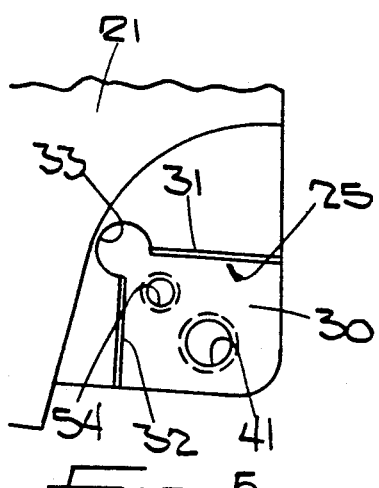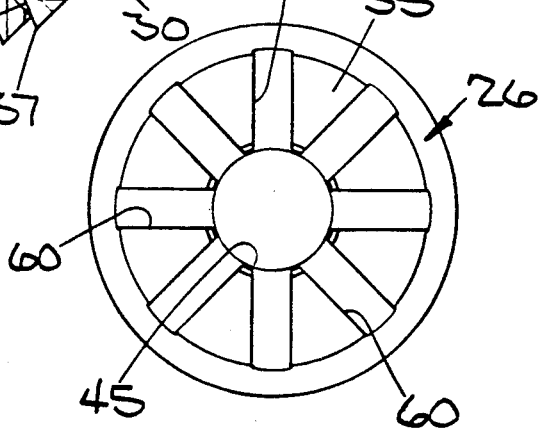

CUTTER WITH POSITIVELY LOCKED ROUND INSERTS

This is a continuation of application Ser. No. 789,299 filed Nov. 8, 1991, now abandoned.

BACKGROUND OF THE INVENTION

This invention relates generally to a metal cutting tool and, more particularly, to a cutting tool having a cutter body with at least one pocket which receives an indexable cutting insert.

One type of cutting tool generally similar to that of the invention is disclosed in commonly assigned Flueckiger U.S. application Ser. No. 07/669,766, filed Mar. 15, 1991 now U.S. Pat. No. 5,145,794. That cutting tool is a milling cutter whose body is formed with a plurality of circumferentially spaced pockets for receiving indexable inserts with multiple cutting edges. The inserts may be of various shapes such as, for example, octagonal, square or round. Each insert is clamped in its pocket by a screw which, when removed, enables the insert to be turned or indexed in the pocket in order to bring a fresh cutting edge into active cutting position.

Each pocket generally comprises a platform against which the insert is clamped and further comprises two angularly related locating shoulders which engage the sides of the insert. When the insert is octagonal or square, the two shoulders engage the sides of the insert in face-to-face relation and hold the insert securely in a predetermined angular position in the pocket. With a round insert, however, there is essentially only point contact between the shoulders and the sides of the insert. Thus, difficulty has been encountered in keeping a round insert in a securely fixed angular position in the pocket.

SUMMARY OF THE INVENTION

The general aim of the present invention is to provide a new and improved cutting tool in which a detent in the pocket coacts uniquely with a round insert to lock the insert securely in an angularly fixed indexed position in the pocket while allowing selective indexing of the insert when successive sections of its cutting edge become worn.

A further object of the invention is to provide a detent which may be selectively rendered inactive so as to enable the use of octagonal, square or other polygonal inserts in the same pocket in place of the round insert.

A more detailed object of the invention is to achieve the foregoing by providing a detent in the form of a screw threaded into the cutter body and formed with a tip which is adapted to project beyond the platform to seat in one of a plurality of angularly spaced recesses formed in the back face of the insert. Such seating locks the insert in a fixed indexed position and holds a predetermined arc of the cutting edge securely in active cutting position. When a polygonal insert is used in the pocket, the screw is backed off to retract the tip of the screw to an inactive position either flush with or behind the platform and thereby avoid interference between the screw and the polygonal insert.

These and other objects and advantages of the invention will become more apparent from the following detailed description when taken in conjunction with the accompanying drawings.

BRIEF DESCRIPTION OF THE DRAWINGS

FIG. 1 is an elevational view of one type of a new and improved cutter incorporating the unique features of the present invention.

FIG. 2 is an enlarged elevational view of one of the pockets and cutting inserts of the cutter shown in FIG. 1.

FIGS. 3 and 4 are fragmentary cross-sections taken substantially along the lines 3—3 and 4—4, respectively, of FIG. 2.

FIG. 5 is a view similar to FIG. 2 but with the insert removed from the pocket.

FIG. 6 is an enlarged view of the rear face of one of the inserts.

DETAILED DESCRIPTION OF THE PREFERRED EMBODIMENT

For purposes of illustration, the invention has been shown in the drawings as embodied in a cutting tool which herein is specifically in the form of a milling cutter 20 for milling the surface of a workpiece made of metal (e.g., steel or aluminum) in order to remove metal from the workpiece and to form the workpiece surface into a desired size and shape. The cutter includes a generally cylindrical body 21 made of steel and having a central axis about which the body is adapted to be rotated. A bore is formed in the center of the body and receives a tool shank adapted to be coupled to the power-rotated spindle of a milling machine such as a Bridgeport mill.

The cutter body 21 includes a lower working end 23 which faces downwardly toward the workpiece. Formed in and spaced angularly around the outer periphery of the lower end portion of the body are several pockets 25 which, as will be explained subsequently, receive indexable inserts 26 preferably made of tungsten carbide for performing the cutting operation on the workpiece. In this particular instance, the cutter 20 has an effective cutting diameter of 4" and is formed with six equally spaced pockets 25. Typical variations include 2", 3" and 6" diameter cutters with 3, 4 and 8 pockets, respectively. A large gullet 27 is formed in the body 21 adjacent each pocket 25 to enable chips cut from the workpiece to flow away from the pockets and clear of the body.

More specifically, each pocket 25 includes a flat platform 30 (FIGS. 3 to 5) which faces generally circumferentially in the direction of rotation of the cutter 20. A generally radially extending locating surface or shoulder 31 (FIG. 5) is formed at the upper end of the pocket while a generally axially extending locating surface or shoulder 32 is located adjacent the inner side of the pocket. The two locating shoulders extend generally at right angles to one another. A blind hole 33 is formed in the body 21 at the corner of the pocket and between adjacent ends of the two shoulders.

The specific inserts 26 which have been illustrated are circular or round inserts. Each insert includes a leading cutting face 34, a flat trailing or rear face 35, and a peripheral edge surface 36 extending between the faces 34 and 35 and inclined relative thereto so as to define a clearance face. A circular cutting edge 37 is defined at the intersection of the cutting face 34 with the clearance face 36.

Each insert 26 is adapted to be clamped releasably in its respective pocket 25 by a screw 40 (FIG. 3) having a threaded shank 41 and having a clamping head 42 with a frustoconical surface. The shank of the screw is adapted to be threaded into a tapped hole 43 formed in the cutter body 21 and opening out of the platform 30. The hole is generally at right angles to the platform but may be slightly inclined such that the upper end of its axis points toward the corner of the pocket 25.

As shown most clearly in FIG. 3, the head 42 of each screw 40 is received in a centrally located hole 45 formed through the insert 26 between the faces 34 and 35 thereof, the hole 45 being generally frustoconical. When the screw 40 is tightened, the head 42 clamps the insert against the platform 30 and, at the same time, crowds the insert toward the corner of the pocket 25 (i.e., toward the hole 33). Such crowding presses the clearance face 36 of the insert against the two locating shoulders 31 and 32.

When the insert is so located, a short angular length of its cutting edge 37 is disposed in active cutting position as shown in FIG. 2 in order to cut the workpiece. Herein, approximately a 45 degree arc of the cutting edge is in active cutting position in each indexed position of the insert. When that portion of the cutting edge becomes worn, the screw 40 is loosened to permit the insert to be turned or indexed through 45 degrees in the pocket 30 and thereby bring a fresh cutting edge portion into active cutting position. The present insert is adapted to be indexed through eight different positions.

Even though the clearance face 36 of each insert 26 is pressed against the locating shoulders 31 and 32 of the respective pocket 25, there is a tendency for the insert 26 to turn angularly in the pocket. Because the clearance face is circular, the clearance face engages the shoulders essentially with only point contact. As a result, a round insert usually is held against turning for the most part only by virtue of being clamped against the platform 30 by the screw 40. If the insert is permitted to turn in the pocket, the designated active cutting edge portion does not remain in a fixed angular position but instead cutting edge portions on either side of the designated cutting edge portion may work their way into the active cutting zone. In extreme cases, the insert may turn through a full index or more.

According to the present invention, each insert 26 is positively locked in a fixed angular position in its pocket 25 by a detent 50 which projects into the pocket and seats against the insert. In the preferred embodiment, the detent may be selectively retracted out of the pocket so as to permit conventional polygonal inserts such as octagonal or square inserts to be seated in the pocket without interference from the detent.

In the preferred embodiment, each detent 50 is a screw formed with a threaded shank 51 (FIGS. 3 and 4) and with a frustoconical tip 52. The end of the screw 50 opposite the tip may be formed with a socket or slot for receiving a driving tool for turning the screw. The screw is threaded into a tapped hole 54 formed in the body 21, extending completely through the body, and opening out of the platform 30 of the pocket 25. In this particular instance, the hole 54 is located between the holes 33 and 41 and its axis lies on a line extending between the axes of the holes 33 and 41 (see FIG. 5).

Further in carrying out the invention, the back face 35 of each insert 26 is formed with a plurality of angularly spaced recesses 60 which selectively receive the tip 52 of the screw 50 to securely hold the insert in a fixed angular position. Herein, each recess 60 is in the form of a radially extending groove which is pressed into the back face 35 of the insert prior to sintering of the insert. Eight grooves 60 are spaced equally around the rear face of the present insert.

When the round inserts 26 are used in the cutter body 21, the tip 52 of each screw 50 projects beyond the platform 30 of the pocket 25 and seats in one of the grooves 60 of the insert in the pocket (see FIGS. 3 and 4). Such seating, together with the clamping force provided by the screw 40, positively holds the insert in a fixed angular position in the pocket and prevents the active cutting edge portion from drifting out of the designated cutting zone. When that cutting edge portion becomes worn, the screw 40 may be loosened and the insert may be indexed through 45 degrees to cause the tip 52 of the screw 50 to be received in an adjacent groove 60 and thereby lock the insert against turning.

When polygonal inserts are used in place of the round insert 26, each screw 50 is turned in a direction to retract the tip 52 to a position at least flush with and preferably behind the platform 30 of the respective pocket 25. As a result, the flat rear face of the polygonal insert may be placed in surface-to-surface engagement with the platform 30 without interference from the tip of the screw. In order to prevent the screw 50 from escaping from the hole 54, the extreme rear portion of the hole is smaller in diameter than the tapped portion of the hole but is sufficiently large to accommodate a driving tool for turning the screw.

From the foregoing, it will be apparent that the present invention brings to the art a new and improved cutting tool 20 in which screws 50 or other types of detents coact with recesses 60 in the back faces 35 of round inserts 26 to positively lock the inserts in fixed angular positions in the pockets 25 and thereby prevent turning of the inserts as the latter cut through the workpiece. This renders the round inserts far more effective than has previously been the case. When the round inserts are not used, the screws 50 may be easily retracted to inactive positions to permit the use of polygonal inserts in the same pockets.

Those familiar with the art will appreciate that the principles of the invention are applicable to so-called hollow ground round inserts as well as the round inserts which have been shown. Also, the invention may be applied to different types of cutters, including non-rotary cutters having but a single pocket.

I claim:

1. A milling cutter comprising a generally cylindrical cutter body having a central axis and adapted to be rotated in a predetermined direction about said axis, said body having an outer periphery and a working end and having a plurality of circumferentially spaced pockets around the outer periphery of said working end, each pocket being defined by a substantially flat platform facing in the direction of rotation of the body, by a generally radially extending shoulder and by a generally axially extending shoulder, the shoulders of each pocket projecting from the platform thereof, generally circular indexable cutting inserts located in said pockets, each of said inserts having a leading cutting face, having a trailing rear face and having an edge surface extending between said faces, each insert being located in its respective pocket with its rear face lying against the platform of the pocket and with its edge surface engaging the shoulders of the pocket, a threaded fastener extending through each insert between the faces thereof and threaded into said body to clamp the insert in its pocket, means coacting with each fastener to lock each insert angularly in any selected one of a plurality of predetermined indexed positions in its pocket, said means comprising a series of angularly spaced grooves in the rear face of each insert, and extending generally radially of the insert, and a detent normally projecting beyond the platform of each pocket and into seating engagement with a selected one of the grooves of the associated insert thereby to lock the insert angularly in the pocket, each detent being a screw supported by said body for selective movement to an inactive position in which the screw is either flush with or retracted behind the respective platform.

2. A milling cutter as defined in claim 1 further comprising a plurality of holes formed through said body in the vicinity of said pockets, each hole having one end opening out of the platform of the respective pocket, each of said screws being threaded into said hole and movable to said inactive position as an incident to being turned in one direction.

3. A milling cutter as defined in claim 2 further including a generally conical tip on one end of each screw and normally projecting beyond the platform of the respective pocket.

4. A milling cutter as defined in claim 2 in which each of said holes includes a second and opposite end accessible from outside of said body, each of said screws being turnable by a tool insertable into the respective hole from the second end thereof, and means in each hole for preventing the screw from moving out of the hole through the second end thereof.

5. A cutting tool comprising a cutter body having a pocket therein, said pocket being defined by a substantially flat platform and by two shoulders extending from said platform, a generally circular indexable cutting insert having a front cutting face, having a rear face and having an edge surface extending between said faces, said insert being located in said pocket with said rear face lying against said platform and with said edge surface engaging said shoulders, a screw extending through said insert between said faces and threaded into said body to clamp said insert within said pocket, and means coacting with said screw to lock said insert angularly in any selected one of a plurality of indexed positions in said pocket, said means comprising a series of angularly spaced recesses in the rear face of said insert, and a detent in said body and normally projecting beyond said platform to an active position in seating engagement with a selected one of said recesses depending upon the indexed position of said insert, said detent comprising a second screw having threads, a hole formed through said body and having a first end at said platform and a second and opposite end accessible from outside of said body, said second screw being threaded into said hole and being movable, as an incident to being turned, from said active position to an inactive position either flush with or retracted behind said platform, said second screw being turnable by a tool insertable into said hole from the second end thereof, and retaining means in said hole and acting independently of said threads for preventing said second screw from moving out of said hole through the second end thereof.

6. A cutting tool as defined in claim 5 in which said hole has a tapped portion of predetermined diameter for threadably receiving said second screw, said second end of said hole being smaller in diameter than said second screw so as to prevent said second screw from moving out of said hole through the second end thereof.

7. A cutting tool comprising a cutter body having a pocket therein, said pocket being defined by a substantially flat platform and by two shoulders extending from said platform, a generally circular indexable cutting insert having a front cutting face, having a rear face and having an edge surface extending between said faces, said insert being located in said pocket with said rear face lying against said platform and with said edge surface engaging said shoulders, a first screw extending through said insert between said faces and threaded into said body to clamp said insert within said pocket, and means coating with said screw to lock said insert angularly in any selected one of a plurality of indexed positions in said pocket, said means comprising a series of angularly spaced recesses in the rear face of said insert, and a detent in said body and normally projecting beyond said platform to an active position in seating engagement with a selected one of said recesses depending upon the indexed position of said insert, said detent comprising a second screw having threads, a hole formed through said body and having a first end at said platform and a second and opposite end accessible from outside of said body, said hole having a tapped portion of predetermined diameter, said second screw being threaded into the tapped portion of said hole from the first end thereof and being movable, as an incident to being turned, from said active position to an inactive position either flush with or retracted behind said platform, said second screw being turnable by a tool insertable into said hole from the second end thereof, said second end of said hole being smaller in diameter than said tapped portion and being smaller in diameter than said second screw so as to prevent said second screw from moving out of said hole through the second end thereof.

* * * * *